(12) United States Patent
Garcia-Osuna et al.

(10) Patent No.: US 7,364,007 B2
(45) Date of Patent: Apr. 29, 2008

(54) INTEGRATED ACOUSTIC TRANSDUCER ASSEMBLY

(75) Inventors: Fernando Garcia-Osuna, Sugar Land, TX (US); Harold Pfutzner, Richmond, TX (US); Alain Dumont, Houston, TX (US); Tetsuya Tanaka, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 200 days.

(21) Appl. No.: 10/904,806

(22) Filed: Nov. 30, 2004

(65) Prior Publication Data

US 2005/0150713 A1  Jul. 14, 2005

Related U.S. Application Data

(60) Provisional application No. 60/535,062, filed on Jan. 8, 2004, provisional application No. 60/534,900, filed on Jan. 8, 2004.

(51) Int. Cl.
*G01V 1/16* (2006.01)
*E21B 47/01* (2006.01)

(52) U.S. Cl. .............. 181/108; 181/110; 181/111; 181/112; 166/255.2; 166/250.16; 166/254.2

(58) Field of Classification Search .............. 181/108, 181/110, 111, 112; 166/255.2, 250.16, 254.2
See application file for complete search history.

(56) References Cited

U.S. PATENT DOCUMENTS 3,191,141 A  6/1965  Schuster
3,786,894 A  1/1974  Lebreton
3,794,976 A  2/1974  Mickler
3,964,014 A  6/1976  Tehon
4,525,644 A  6/1985  Frohlich
4,649,525 A  3/1987  Angona et al.
4,649,526 A  3/1987  Winbow et al.

(Continued)

FOREIGN PATENT DOCUMENTS

EP  1 046 762 A2  10/2000

(Continued)

OTHER PUBLICATIONS

Borre, M. et al., "Fluid Substitution in Horizontal Chalk Wells and its Effect on Acoustic Rock Properties—a Case Study Comparing Logging While Drilling and Wireline Acoustic Data," SPWLA 45th Annual Logging Symposium, Jun. 6-9, 2004; pp. 1-12.

(Continued)

*Primary Examiner*—Lincoln Donovan
*Assistant Examiner*—Jeremy Luks
(74) *Attorney, Agent, or Firm*—Matthias Abrell; Jaime Castano; Dale Gaudier

(57) ABSTRACT

Acoustic transducers configured with integrated electronics technology are adapted to digitize signal data close to the transducer. The transducers are packaged with a reduced number of elements and sealed for exposure to harsh environments, without oil compensation. A transducer assembly includes a frame, an acoustic transducer element disposed on the frame, and an electronics module disposed on the frame and linked to the acoustic transducer element. The pressure and temperature tolerant electronics module is adapted to process a signal associated with the transducer element.

63 Claims, 13 Drawing Sheets

U.S. PATENT DOCUMENTS

| | | | |
|---|---|---|---|
| 4,665,511 A | 5/1987 | Rodney et al. | |
| 4,700,803 A * | 10/1987 | Mallett et al. | 181/106 |
| 4,813,028 A | 3/1989 | Liu | |
| 4,932,003 A | 6/1990 | Winbow et al. | |
| 4,947,683 A | 8/1990 | Minear et al. | |
| 4,951,267 A | 8/1990 | Chang et al. | |
| 5,027,331 A | 6/1991 | Winbow et al. | |
| 5,030,873 A | 7/1991 | Owen | |
| 5,036,945 A | 8/1991 | Hoyle et al. | |
| 5,043,952 A | 8/1991 | Hoyle et al. | |
| 5,058,078 A | 10/1991 | Eyl et al. | |
| 5,063,542 A | 11/1991 | Petermann et al. | |
| 5,069,308 A | 12/1991 | Yin et al. | |
| 5,077,697 A | 12/1991 | Chang | |
| 5,081,391 A * | 1/1992 | Owen | 310/334 |
| 5,251,188 A | 10/1993 | Parsons et al. | |
| 5,309,404 A | 5/1994 | Kostek et al. | |
| 5,354,956 A | 10/1994 | Orban et al. | |
| 5,377,160 A | 12/1994 | Tello et al. | |
| 5,387,767 A | 2/1995 | Aron et al. | |
| 5,418,335 A * | 5/1995 | Winbow | 181/106 |
| RE34,975 E | 6/1995 | Orban et al. | |
| 5,444,324 A | 8/1995 | Priest et al. | |
| 5,469,736 A | 11/1995 | Moake | |
| 5,583,293 A | 12/1996 | Flogel | |
| 5,644,186 A | 7/1997 | Birchak et al. | |
| 5,678,643 A * | 10/1997 | Robbins et al. | 175/45 |
| 5,724,308 A * | 3/1998 | Sorrells et al. | 367/34 |
| 5,753,812 A | 5/1998 | Aron et al. | |
| 5,796,677 A | 8/1998 | Kostek et al. | |
| 5,852,262 A | 12/1998 | Gill et al. | |
| 5,852,587 A | 12/1998 | Kostek et al. | |
| 5,877,996 A * | 3/1999 | Krokstad et al. | 367/31 |
| 5,886,303 A | 3/1999 | Rodney | |
| 5,936,913 A * | 8/1999 | Gill et al. | 367/25 |
| 5,987,385 A * | 11/1999 | Varsamis et al. | 702/6 |
| 6,084,826 A | 7/2000 | Leggett, III | |
| 6,102,152 A | 8/2000 | Masino et al. | |
| 6,166,998 A | 12/2000 | Hare et al. | |
| 6,213,250 B1 | 4/2001 | Wisniewski et al. | |
| 6,366,531 B1 | 4/2002 | Varsamis et al. | |
| 6,466,513 B1 | 10/2002 | Pabon et al. | |
| 6,474,439 B1 | 11/2002 | Hoyle et al. | |
| 6,501,211 B1 | 12/2002 | Nasrollahzadeh | |
| 6,538,576 B1 | 3/2003 | Schultz et al. | |
| 6,552,962 B1 | 4/2003 | Varsamis et al. | |
| 6,568,486 B1 * | 5/2003 | George | 175/45 |
| 6,614,360 B1 | 9/2003 | Leggett, III et al. | |
| 6,631,327 B2 | 10/2003 | Hsu et al. | |
| 6,667,620 B2 * | 12/2003 | Homan et al. | 324/339 |
| 6,711,096 B1 | 3/2004 | Benjamin | |
| 6,788,263 B2 | 9/2004 | Clark et al. | |
| 6,837,332 B1 | 1/2005 | Rodney | |
| 2002/0113717 A1 | 8/2002 | Tang et al. | |
| 2003/0150273 A1 | 8/2003 | Ptchelintsev et al. | |
| 2004/0061622 A1 | 4/2004 | Clark | |
| 2004/0095847 A1 | 5/2004 | Hassan et al. | |
| 2004/0158997 A1 | 8/2004 | Tang | |
| 2004/0202047 A1 | 10/2004 | Fripp et al. | |
| 2004/0257241 A1 * | 12/2004 | Menger | 340/854.3 |

FOREIGN PATENT DOCUMENTS

| | | |
|---|---|---|
| EP | 1467060 | 10/2004 |
| EP | 1469161 | 10/2004 |
| GB | 2287789 | 9/1995 |
| SU | 1550453 | 3/1990 |
| WO | WO 97/49894 A1 | 12/1997 |
| WO | WO03/060559 | 7/2003 |
| WO | WO 03/071097 A1 | 8/2003 |

OTHER PUBLICATIONS

Gravem, T. et al., "North-Sea Acoustic LWD Field-Test Results Utilizing Integrated System Approach," SPWLA 44th Annual Logging Symposium, Jun. 22-25, 2003; pp. 1-11.

* cited by examiner

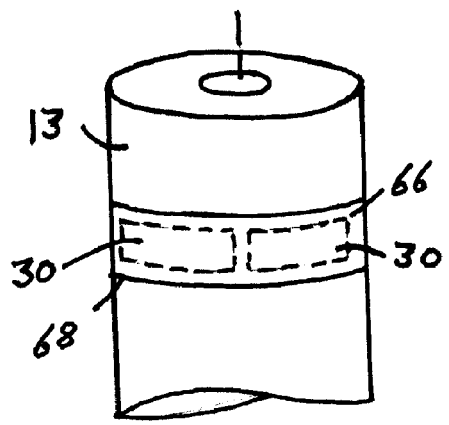
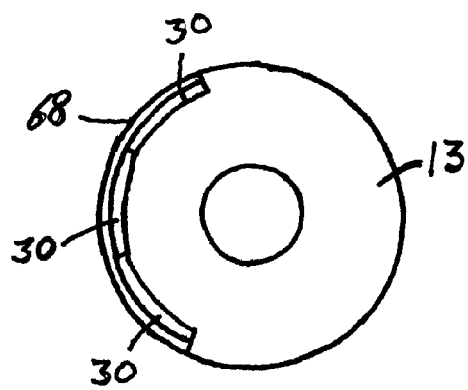
FIG. 12A     FIG. 12B
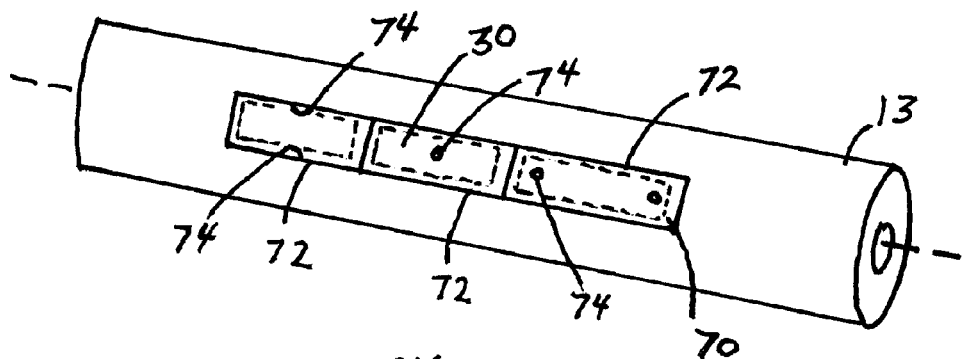
FIG. 13
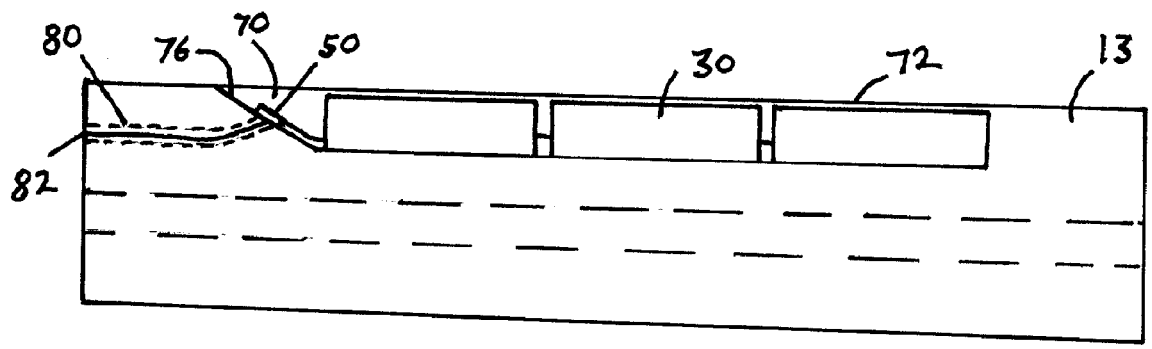
FIG. 14

INTEGRATED ACOUSTIC TRANSDUCER ASSEMBLY

CROSS-REFERENCE TO RELATED APPLICATIONS

This invention claims priority pursuant to 35 U.S.C. § 119 of U.S. Provisional Patent Application Ser. No. 60/535,062, filed on Jan. 8, 2004, and U.S. Provisional Patent Application Ser. No. 60/534,900, filed on Jan. 8, 2004. These Provisional Applications are hereby incorporated by reference in their entirety.

BACKGROUND OF INVENTION

1. Field of the Invention

The invention relates generally to acoustic transducers. More particularly, this invention relates to improved acoustic sources and sensors for subsurface applications.

2. Background Art

In the oil and gas industry, subsurface formations are typically probed by well logging instruments to determine the formation characteristics. Among these instruments, sonic tools have been found to provide valuable information regarding subsurface acoustic properties, which may be used to produce images or derive related characteristics for the formations.

Acoustic waves are periodic vibrational disturbances resulting from acoustic energy that propagates through a medium, such as a subsurface formation. Acoustic waves are typically characterized in terms of their frequency, amplitude, and speed of propagation. Acoustic properties of interest for formations may include compressional wave speed, shear wave speed, borehole modes, and formation slowness. Additionally, acoustic images may be used to depict borehole wall conditions and other geological features away from the borehole. These acoustic measurements have applications in seismic correlation, petrophysics, rock mechanics and other areas.

Recordings of acoustic properties as functions of depth are known as acoustic logs. Information obtained from acoustic logs may be useful in a variety of applications, including well to well correlation, porosity determination, determination of mechanical or elastic rock parameters to give an indication of lithology, detection of over-pressured formation zones, and the conversion of seismic time traces to depth traces based on the measured speed of sound in the formation.

Sonic logging of earth formations entails lowering an acoustic logging instrument or tool into a borehole traversing the formation. The instrument typically includes one or more acoustic sources (i.e., a transmitter) for emitting acoustic energy into the subsurface formations and one or more acoustic sensors or receivers for receiving acoustic energy. The transmitter is periodically actuated to emit pulses of acoustic energy into the borehole, which travel through the borehole and into the formation. After propagating through the borehole and formation, some of the acoustic energy travels to the receivers, where it is detected. Various attributes of the detected acoustic energy are subsequently related to subsurface or tool properties of interest.

FIG. 1 shows a conventional downhole sonic tool. The tool 10 is shown disposed in a borehole 12 traversing an earth formation 20. The borehole 12 is typically filled with a drilling fluid 14 ("mud") that is used during the drilling of the borehole. The tool 10 is generally implemented in a tubular 13 support, which in the case of a drill collar includes an internal passage 13A for drilling fluid 14 to reach a mud motor and/or a drill bit at the bottom of a drill string (not shown) as known in the art. The logging tool 10 includes one or more acoustic transmitters 16 and a plurality of acoustic receivers 18 disposed on the tubular 13. The receivers 18 are shown spaced apart from each other, along the longitudinal axis of the tool 10, at a selected distance h. One of the receivers 18 closest to the transmitter 16 is axially spaced there from by a selected distance a. The tool 10 also houses one or more conventional computer modules 21 including microprocessors, memory, and software to process waveform signal data as known in the art. As also known in the art, the computer module(s) 21 can be disposed within the instrument, at the earth surface, or combined between the two as shown in FIG. 1. Acoustic energy waves 22 are shown propagating in the borehole. Conventional sonic downhole tools are described in U.S. Pat. Nos. 5,852,587, 4,543,648, 5,510,582, 4,594,691, 5,594,706, 6,082,484 6,631,327, 6,474,439, 6,494,288, 5,796,677, 5,309,404, 5,521,882, 5,753,812, RE34,975 and 6,466,513.

Conventional acoustic tools are equipped with acoustic transducer elements, such as piezoelectric elements. In general, an acoustic transducer converts energy between electric and acoustic forms and can be adapted to act as a source or a sensor. Acoustic transducers are typically mounted on the body of the logging tool as shown in FIG. 1. Conventional sonic sources and sensors used in downhole tools are described in U.S. Pat. Nos. 6,466,513, 5,852,587, 5,886,303, 5,796,677, 5,469,736 and 6,084,826. For various reasons, including space constraints, these transducers typically have multiple components compacted into a package mounted on the tool with the front-end electronics and circuitry disposed remotely from the transducer elements.

Acoustic transducer devices have also been incorporated in configurations using printed circuit boards (PCBs). U.S. Pat. No. 6,501,211 describes an ultra-sonic transducer implemented in a PCB for attachment to bolt heads. The proposed transducers are coupled to a remote computer for identification of the bolts using the transducer. U.S. Pat. No. 4,525,644 describes mechanisms using piezoelectric devices located next to PCB connection pads to increase engagement forces between the connection pads and connectors. EP 1467060 A1 describes flexible piezoelectric transducers for use with downhole tools to telemeter acoustic signals through the tools. Drawbacks of these conventional acoustic transducer systems include poor sensitivity and a need for bulky electronics packages (e.g., large preamplifier stages) disposed elsewhere.

It is desirable to have improved acoustic transducers with integrated electronics and processing means without sacrificing performance and sensitivity.

SUMMARY OF INVENTION

One aspect of the invention provides an acoustic transducer assembly for subsurface use. The assembly comprising a frame; an acoustic transducer element disposed on the frame; and an electronics module disposed on the frame and linked to the acoustic transducer element; wherein the electronics module is adapted to process a signal associated with the transducer element.

One aspect of the invention provides an acoustic transducer assembly for subsurface use. The assembly comprising a frame; an acoustic transducer element disposed on the frame; an electronics module disposed on the frame and linked to the acoustic transducer element; and the electronics module adapted to digitize a signal associated with the transducer element; wherein the transducer element and the electronics module are covered with a sealing material to protect against external fluids.

One aspect of the invention provides an acoustic transducer assembly for subsurface use. The assembly comprising a disc-shaped acoustic transducer element having a first surface opposite a second surface; an electronics module coupled to the second surface of the transducer element and adapted to process a signal associated with said acoustic transducer element; the electronics module having at least one signal lead coupled thereto; acoustic damping material disposed around the electronics module and the acoustic transducer element; wherein the acoustic transducer element, the electronics module, and the damping material are enclosed within a sealing material leaving the at least one lead exposed.

One aspect of the invention provides an acoustic transducer assembly for subsurface use. The assembly comprising an elongated planar frame; an acoustic transducer element disposed on the frame; and an electronics module disposed on the frame and linked to the acoustic transducer element; wherein the electronics module is adapted to digitize a signal associated with the transducer element.

One aspect of the invention provides a method for assembling an acoustic transducer. The method including disposing an acoustic transducer element on frame means; disposing an electronics module on the frame means; linking the acoustic transducer element to the electronics module, the electronics module adapted to digitize a signal associated with the transducer element; and covering the transducer element and the electronics module with a sealing material not including liquids

BRIEF DESCRIPTION OF DRAWINGS

FIG. 12A is a schematic of an azimuthally disposed transducer in accord with the invention.

FIG. 12B is an overhead view of the azimuthal transducer of FIG. 12A.

FIG. 13 is a schematic of an axial transducer disposed in a tubular in accord with the invention.

FIG. 14 is a side view of a linked transducer disposed in a tubular in accord with the invention.

DETAILED DESCRIPTION

Acoustic transducers of the invention comprise electronics technology packaged such that they are suitable for exposure to harsh environments, such as a subsurface well. The transducers of the invention can be configured with a reduced number of elements and associated electronics compared to conventional designs. Circuitry is minimized and signal data are preferably digitized close to the transducer.

Transducers used as acoustic receiver arrays to measure acoustic waves in boreholes should be small and preferably individual in order to measure the acoustic wave modes propagating in the borehole such as monopole, dipole, quadrupole, and higher-order modes. Similarly these acoustic transducers should operate in different modes to reject unwanted modes. For example, in dipole or quadrupole measurements, better quality measurements may be obtained by rejecting the monopole mode. Embodiments of the invention include active sensors, with integrated electronics, that are independent and suitable for exposure to subsurface conditions.

Figure 2:
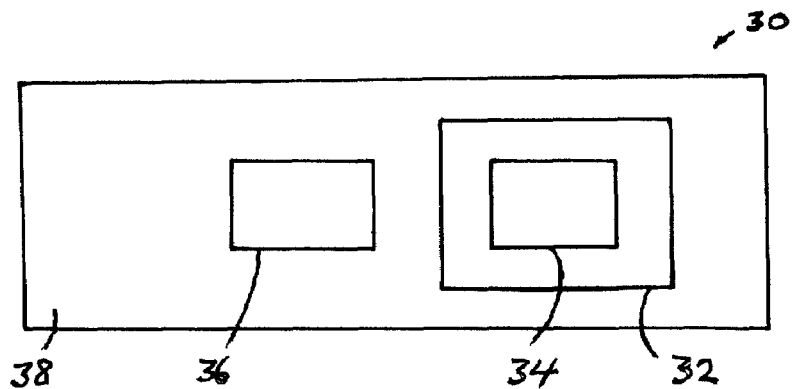
FIG. 2 is a schematic of a transducer in accord with the invention.

FIG. 2 shows a transducer 30 embodiment of the invention. The transducer 30 includes a front-end electronics module 32 comprising analog and digital circuitry 34 integrated with an acoustic transducer element 36 and disposed in a frame 38. The coupling between the electronics module 32 and transducer element 36 will be described below. The transducer element 36 may consist of piezoelectric devices, lead titanate (PT) devices, lead zirconatetitanate (PZT) devices, 1-3 piezocomposite type devices, or any other suitable materials known in the art. The transducer elements 36 of the invention can be disposed on the frame 38 along with conventional transducers for added reliability and performance.

Figure 3:
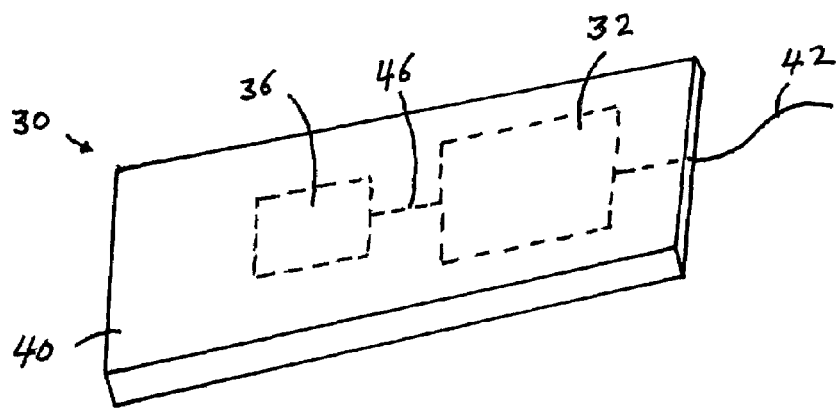
FIG. 3 shows a perspective view of a sealed transducer in accord with the invention.

The frame 38 is shown projected as a two-dimensional or planar surface for clarity of illustration. In some embodiments, the frame 38 may be formed as a strip, also referred to as a flex circuit (described in U.S. Pat. Nos. 6,351,127, 6,690,170, 6,667,620, 6,380,744). Flex-circuit frame embodiments may be formed of any suitable electrically nonconductive material or dielectric film substrate, such as polyimide film or a polyester film having a thickness selected to enable bending or flexing (e.g., to surround a tubular or to fit within a void in a tubular). Techniques for producing strips to form the flexible frames are described in U.S. Pat. No. 6,208,031. In addition to flexible frames 38, other embodiments may be implemented with single or multi-layered PCB frames. Conductors on the frame 38 may be formed of fine strips of copper or other suitable materials disposed thereon as known in the art. The transducer embodiments of the invention may be waterproofed by covering or sealing the module and transducer assemblies with a suitable resin or compound 40 (e.g., a rubber layer), as shown in FIG. 3. One or more leads 42 linked to the electronics module 32 are left exposed for signal/power transmission.

Figure 4:
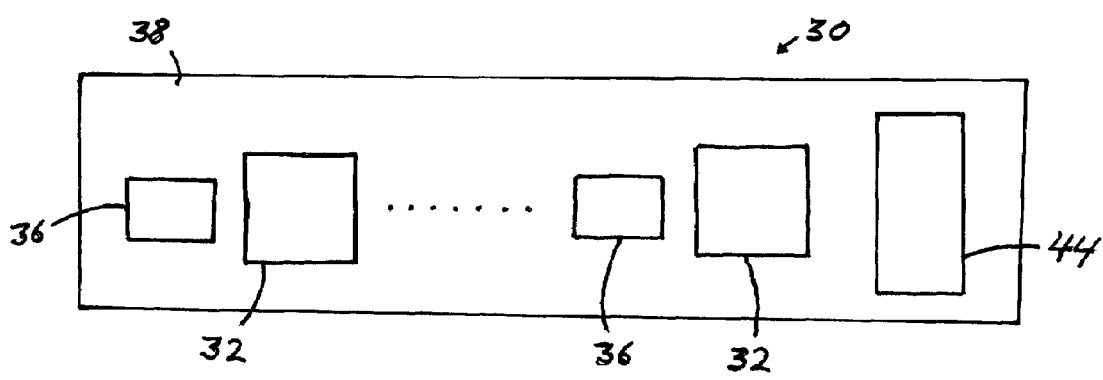
FIG. 4 is a schematic of a multi-element transducer in accord with the invention.

Embodiments of the invention may also be implemented with multiple transducer elements 36 disposed on a single frame 38. FIG. 4 shows an array of individual acoustic transducer elements separated from one another (e.g., by a few centimeters). The transducer array may be implemented with "n" number of elements 36 mounted on the frame 38. When implemented as a receiver, the multi-element transducer 30 can be used to measure any borehole acoustic modes. Multi-element 36 transducer embodiments are preferably equipped with an electronic multiplexer module 44 to streamline signal communication to/from the transducer elements 36. As previously mentioned, conductors and circuitry elements (e.g., item 46 in FIG. 3) provide signal paths between components. Conductors and circuitry elements are not shown in all figures for clarity of illustration. With these embodiments, the number of acoustic channels per transducer array can be increased because they can be digitally multiplexed.

Figure 5:
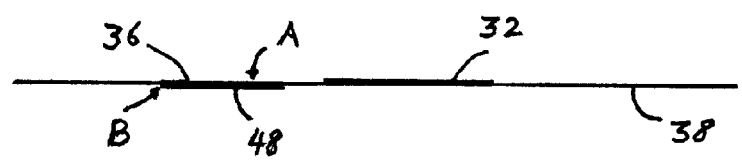
FIG. 5 is a side view of a damped transducer in accord with the invention.

The transducers 30 may also be equipped with an acoustic damping material to reject unwanted vibrations. FIG. 5 shows a side view of a transducer embodiment including a damping element 48 located on one side of the transducer element 36. The damping element 48 may be formed of a heavy-mass material (e.g., Tungsten) or any other suitable material as known in the art. When the transducer element 36 is activated as an acoustic source, the damping element 48 aids in reducing vibrations on side B of the transducer element while improving sound directionality from side A. Although the damping material 48 is shown on one side of the transducer element 36 in FIG. 5, other embodiments may be implemented with damping material disposed in a different fashion (e.g., completely surrounding the transducer element, leaving side A clear). The acoustic transducer/ damping element assembly may be disposed on the surface of the frame 38, in a void or cutout within the frame, or wholly encased within a rubber compound forming the frame (See item 40 in FIG. 3).

Figure 6:
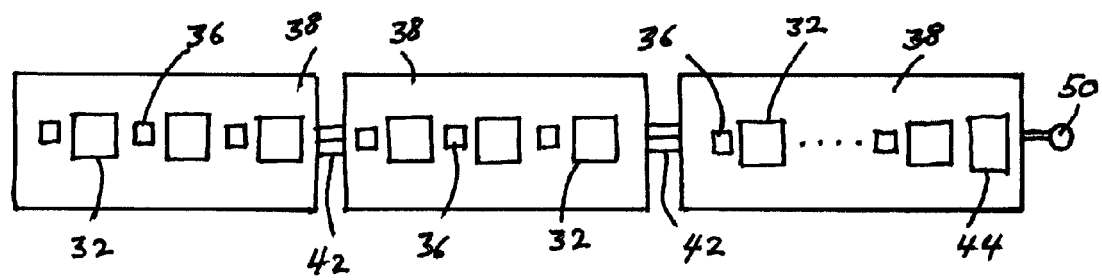
FIG. 6 shows a segmented transducer array in accord with the invention.

FIG. 6 shows another transducer assembly 30 embodiment of the invention. Multiple frames 38 are linked with leads 42 to form an extended transducer array. Each frame 38 may be implemented with a plurality of transducer elements 36 and electronics modules 32 to produce an acoustic array of "n" digital channels. The array may include one or more digital multiplexer modules 44 disposed on one or more frames 38 to efficiently channel the signals associated with the transducer elements/electronics modules. The embodiment shown in FIG. 6 includes a connector 50 (also referred to as a "bulkhead") linked to the assembly to provide a single signal/power junction. Conventional connectors 50 may be used to implement the invention as known in the art.

Figure 7:
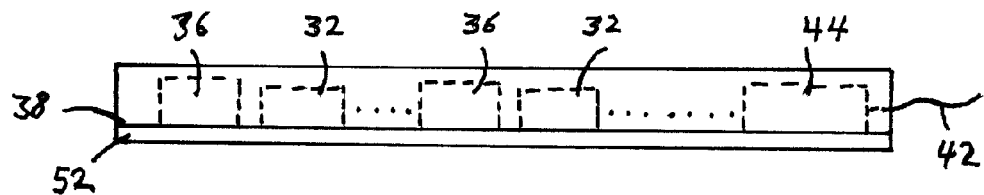
FIG. 7 is a side view of a reinforced transducer in accord with the invention.

Structural reinforcement for the transducer assemblies of the invention can be achieved by buttressing the frame(s) 38. FIG. 7 shows a side view of a transducer 30 embodiment equipped with a support 52, forming a rigid base for the transducer elements/electronics modules. The support 52 is formed of any suitable material, such as metal. The support 52 can be joined to a frame 38 using an adhesive, fasteners, or any suitable means known in the art. The embodiment shown in FIG. 7 is formed with the assembly of transducer elements 36, electronics modules 32, and multiplexer(s) 44 overmolded with a rubber compound similar to the embodiment shown in FIG. 3. The support 52 is affixed to the bottom side of the rectangular-shaped transducer assembly. The support 52 may also be encased within the rubber compound if desired. Some embodiments can be equipped with multiple supports 52 joined to other surfaces on the transducer assembly (e.g., on top and bottom) or with segmented supports 52 as desired for the particular implementation (not shown). A heavy-mass support 52 can also provide vibration damping and aid in acoustic directionality similar to the embodiment described with respect to FIG. 5.

Figure 8:
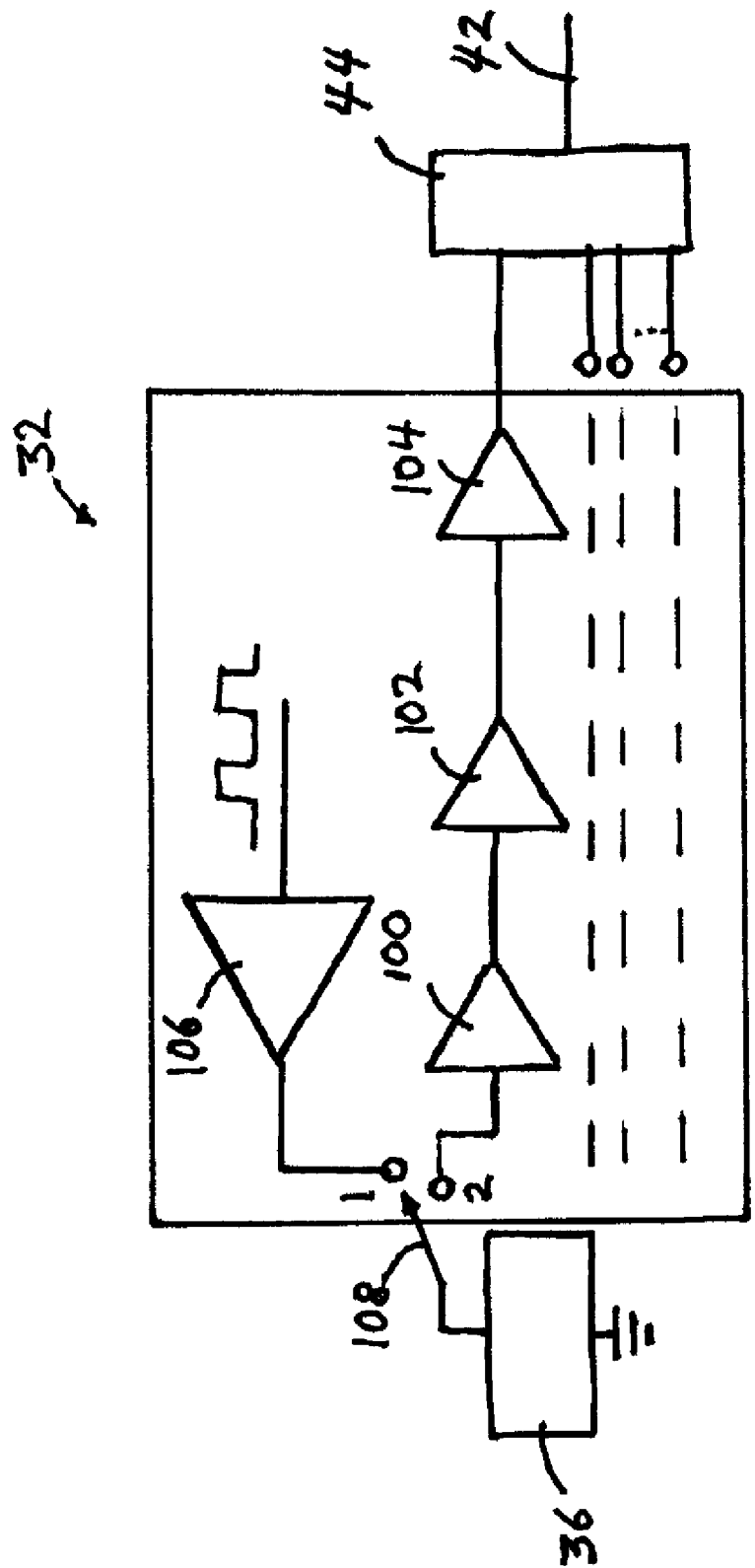
FIG. 8 is a schematic of a transducer electronics module and multiplexer module in accord with the invention.

FIG. 8 shows a general schematic layout of an electronics module 32 in a transducer assembly of the invention. The module 32 includes a preamplifier stage 100, a filter stage 102, an analog-digital converter (ADC) stage 104, and a power amplifier stage 106. The module 32 is shown linked to an n-to-1 multiplexer (MUX) unit 44 adapted to funnel "n" signals to one channel for output through lead 42. A switch 108 linked to the transducer element 36 toggles between position 1 and position 2. In position 1, the transducer element 36 is activated by the power amplifier stage 106 and the transducer is implemented as a transmitter. With the switch 108 in position 2, the preamplifier stage 100 receives the analog acoustic energy signal detected by the element 36 and it is processed through the module 32 to implement a receiver. The small package and low power electronics module 32 integrated with the transducer element 36 minimizes power consumption and improves noise reduction since digital signals are cleaner compared to analog signals. The digitized signal data can also be routed far distances for additional processing free of unwanted noise if desired.

Figure 9:
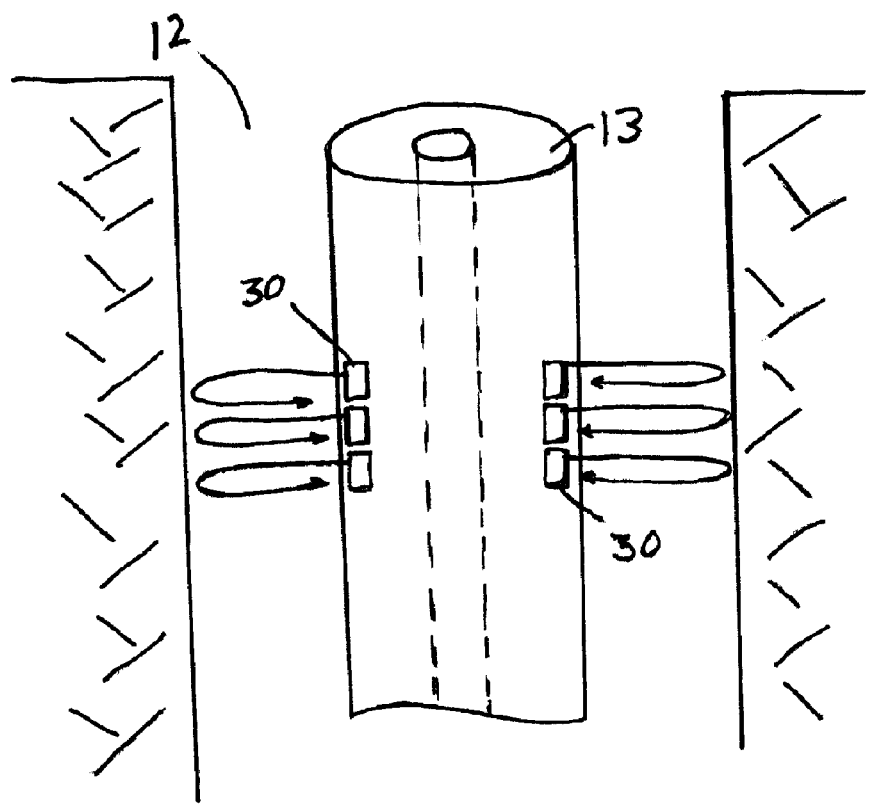
FIG. 9 shows a downhole tubular equipped with acoustic transducers of the invention.

The dual-purpose transducers (i.e., source-sensor) of the invention allow for pulse echo measurements. As known in the art, the measurement of two-way travel time of a pulse echo signal reflected from the borehole 12 wall can be used to determine the borehole geometry, such as its radius. FIG. 9 shows an embodiment of the invention operating in a pulse echo mode. A downhole tubular 13 is equipped with several axially and azimuthally distributed transducers 30 of the invention. Using an electronic module 32, the transducer element(s) 36 can be switched between modes to obtain the pulse echo measurements in the borehole 12. The measured acoustic signal data can be processed using conventional techniques known in the art.

Figure 10:
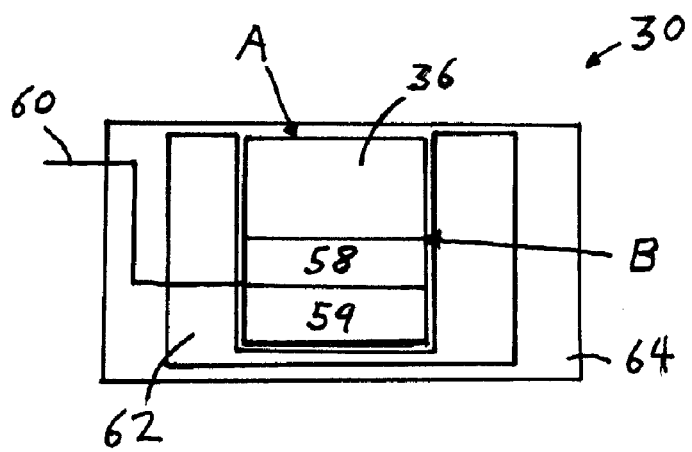
FIG. 10 is a schematic of a "cup" type transducer in accord with the invention.

FIG. 10 shows another acoustic transducer 30 embodiment of the invention. Although a side view of the transducer 30 is shown, the assembly is "cup" shaped with a housed disc-shaped transducer element 36 having a first surface A and a second surface B. The transducer element 36 may consist of a piezoelectric device, lead titanate (PT), lead zirconate-titanate (PZT), 1-3 piezocomposite type synthetic material, or any other suitable materials known in the art. An electronics module 58 comprising a charge amplifier stage abuts against transducer element surface B to convert acoustic energy detected at transducer surface A to voltage signals proportional to the detected acoustic pressure.

Signals/power are driven along one or more leads 60 coupled to the electronics module 58 to operate the transducer in a pulse-echo mode or as a digital receiver. A damping material 62 surrounds the electronics module/transducer assembly to form the cup, leaving transducer surface A clear. Any suitable damping material known in the art may be used. The entire cup assembly is encased or sealed within a suitable material 64 (e.g., rubber compound) to waterproof the sensor, forming a puck with lead(s) 60 exposed. This transducer embodiment provides a much smaller package compared to conventional cup-type transducers, allowing its use in tubulars of any size. For example, a cup transducer 30 of the invention can be assembled with dimensions in the range of 2.54 cm in diameter by 1.3 cm in height. The electronics module 58 of the transducer 30 embodiment of FIG. 10 can also be configured with switching means and processing circuitry 59, as described in FIG. 8, to implement a source or sensor as desired.

Figure 1:
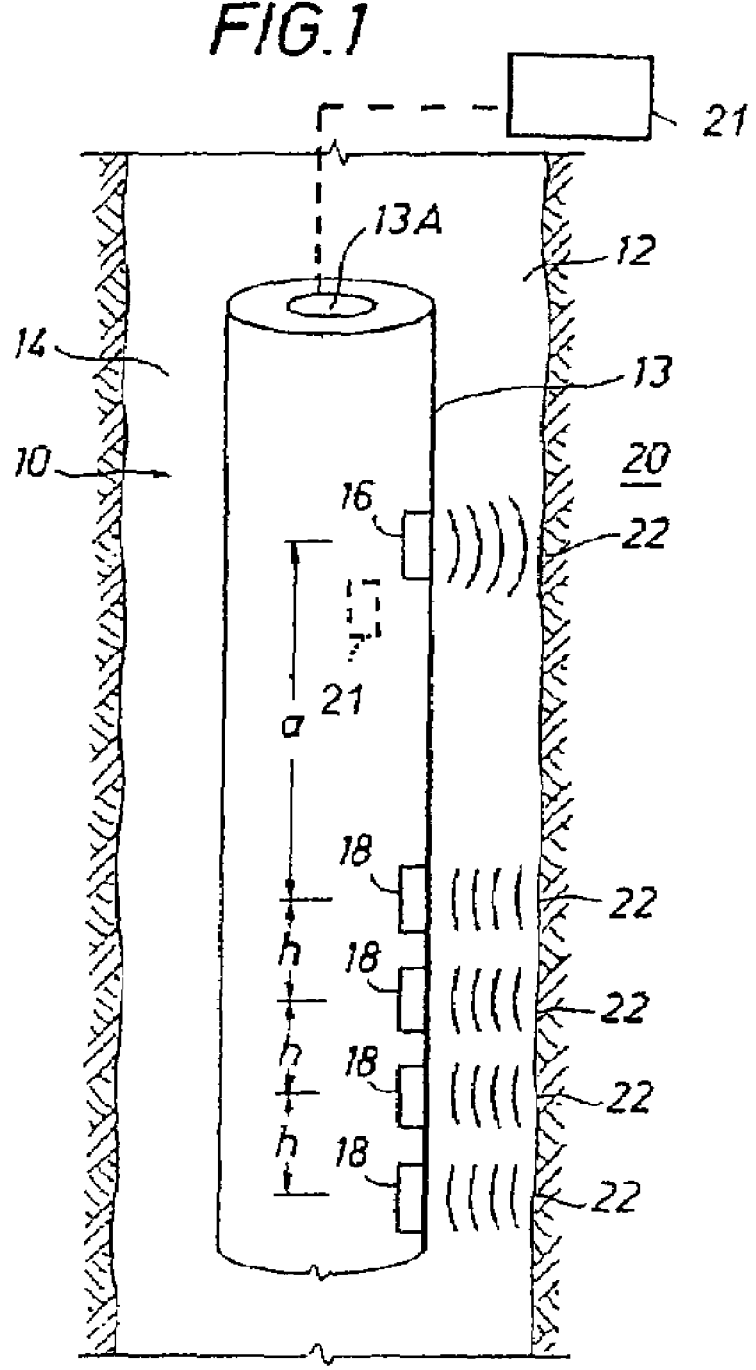
FIG. 1 is a schematic of a conventional downhole sonic tool.
Figures 11A, 11B, 11C:
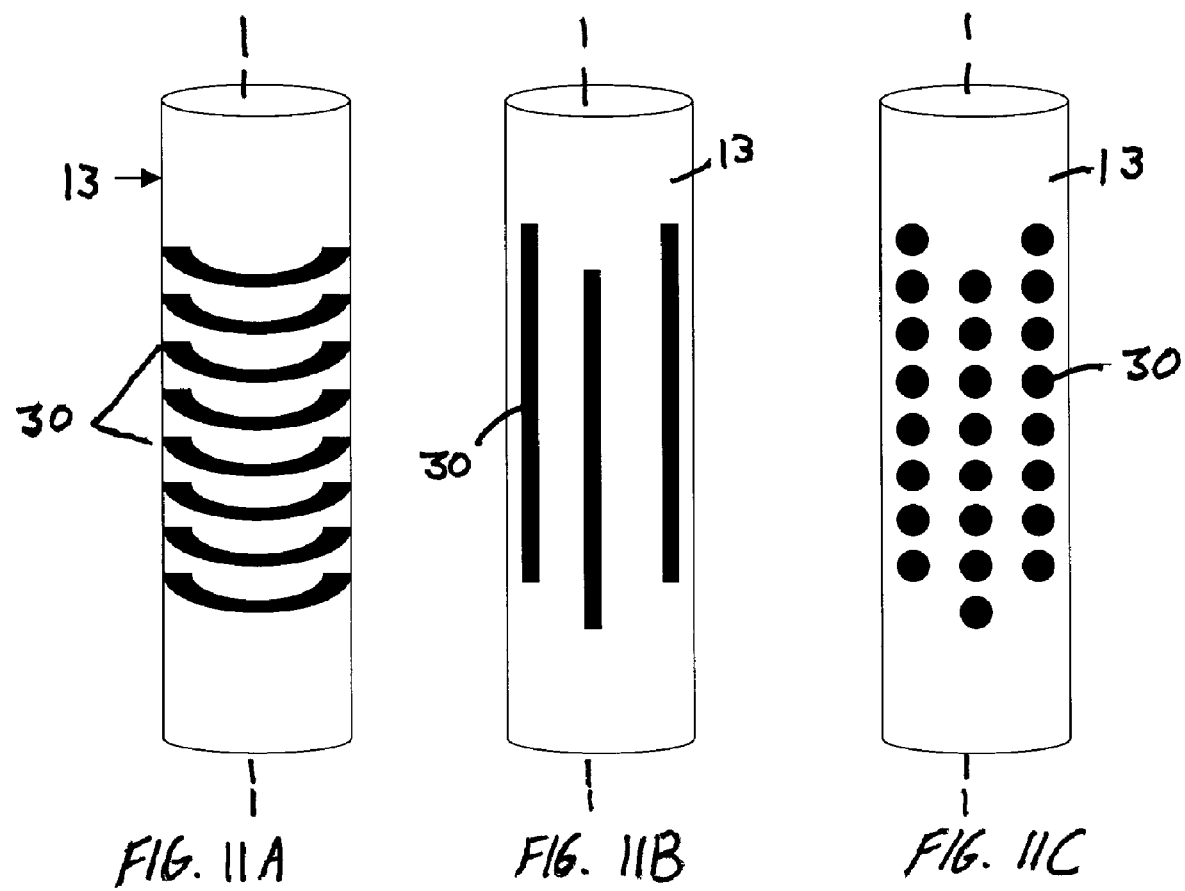
FIG. 11A is a schematic of a downhole tubular incorporating azimuthally disposed transducers in accord with the invention.
FIG. 11B is a schematic of a downhole tubular incorporating axially disposed transducers in accord with the invention.
FIG. 11C is a schematic of a downhole tubular incorporating cup type transducers in accord with the invention.

The small size, high sensitivity, directionality, and low power consumption offered by the transducers of the invention make them feasible for implementation in an unlimited number of environments and applications. FIGS. 11(A)-11(C) show three downhole tubulars 13, similar to the tubular in FIG. 1, equipped with acoustic transducer 30 embodiments of the invention. The embodiment in FIG. 11(A) shows an azimuthal transducer array. The embodiment in FIG. 11(B) shows an axial transducer array. The transducers 30 in these configurations can use the flex-circuit frames 38, individual PCB frames 38, or the linked frames 38 described herein. The embodiment in FIG. 11(C) shows an array using the cup transducer 30 embodiments shown in FIG. 10. The small-sized cup transducer 30 configuration represents a point source. Any of these arrays may be used for multi-pole acoustic measurements. Other embodiments can be implemented with any combination of the disclosed transducer configurations. For example, a tubular could be equipped with the axial and cup transducers shown in FIGS. 11(B) and 11(C) (not shown). In addition to providing for multiple measurements, such a configuration would also provide backup sources and sensors in case of failures.

FIG. 12(A) shows an azimuthal transducer band from the embodiment shown in FIG. 11(A). The transducers 30 are disposed in a shallow recess 66 formed in the tubular. FIG. 12(B) shows an overhead view of the transducers 30 within the recess 66. The transducers 30 may be mounted on the tubular using any suitable means known in the art (e.g., by potting them in with a rubber compound) since they are sealed waterproof and can be exposed to the borehole. A shield assembly 68 may also be placed on the tubular 13 to cover and protect the transducers 30 against abrasion. The shields 68 may be formed of metal, plastic compounds (e.g., PEEK™), or any suitable materials known in the art. U.S. Pat. No. 6,788,065 describes various tubulars configured with recess and shield configurations that may be used to implement embodiments of the invention. The shields 68 are preferably configured with voids or apertures (e.g., holes or slots) to allow the passage of borehole fluids within the spacing between the shield(s) and transducer 30 face. The shield(s) 68 may be mounted on the tubular 13 using fasteners or any suitable means known in the art.

Figure 12C:
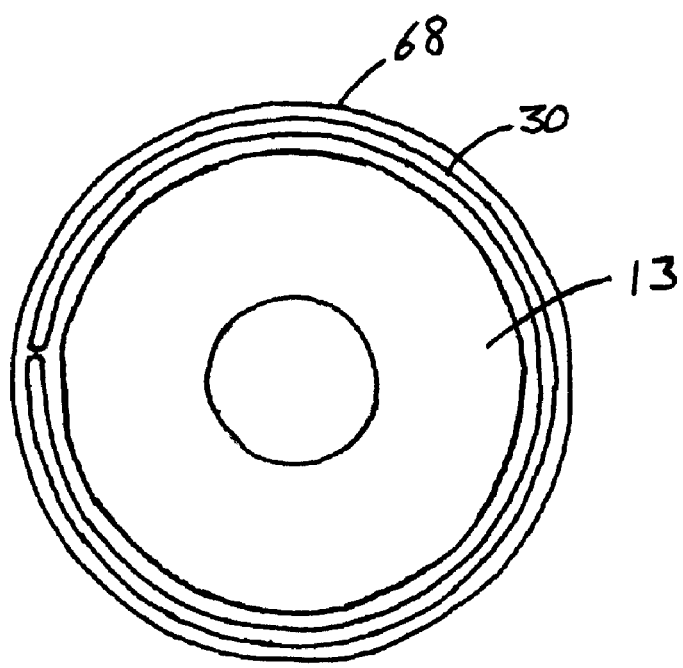
FIG. 12C is an overhead view of a transducer of the invention azimuthally disposed about the circumference of a tubular.

The azimuthal transducer 30 arrays shown in FIGS. 11(A) and 12(A) may be disposed to encompass the full circumference of the tubular 13, to encompass specific sectors as shown in FIG. 12(B), or in staggered azimuthal sectors along the longitudinal axis of the tubular (not shown). FIG. 12(C) shows an overhead view of a transducer 30 array disposed about the circumference of the tubular 13. The miniature sizing of the transducer 30 embodiments of the invention allows their placement in smaller voids within the tubulars 13 compared to conventional transducer designs. This provides for downhole tools with improved mechanical strength and improved acoustic response. The small sizing of the transducers 30 allows their placement on a tubular with minimal spacing between transducer elements 36. For example, a downhole tool equipped with an axial array of transducers 30 spaced mere centimeters apart (e.g., 5-16 centimeters), such as shown in FIG. 13, can be used to send/receive a tighter envelope of acoustic waves along a desired length along a borehole. Such measurements will provide improved imaging and formation analysis capabilities.

FIG. 13 shows an axial transducer array similar to the embodiment shown in FIG. 11(B). One transducer 30 or a series of transducers 30 (See FIG. 6) may be disposed in a shallow channel or recess 70 formed in the tubular. As described above, shields 72 can be placed over the transducer(s) 30 for protection against abrasion. The shields 72 may be formed of any suitable material and are preferably configured with one or more apertures 74. As shown in FIG. 13, the aperture(s) 74 may be formed on different locations on the shields 72. From left to right on FIG. 13, the first shield 72 is configured with two half-moon apertures 74 formed on the edges of the shields. The middle shield 72 is configured with an aperture 74 formed in the center of the shield. And the far right shield 72 is configured with apertures 74 formed at opposite ends of the shield. Although not shown in all figures for clarity of illustration, signal/power communication is provided to or from the transducers of the invention using any suitable means as known in the art.

FIG. 14 shows a side view of an embodiment similar to that shown in FIG. 13. In this embodiment, the recess 70 is formed with a ramp 76 at one end and a series of linked transducers 30 are located in the recess. A one-piece shield 72 or several individual shields (See FIG. 13) may be used to cover the transducers 30. The transducers 30 are coupled to one another as described above and signals/power are routed via a connector 50 as described in FIG. 6. The connector 50 ties into a passage 80, also referred to as a feedthrough, for signal/power transmission between the transducers 30 and other components (e.g., electronics, telemetry, memory storage, etc.) via one or more leads 82 as known in the art.

Figure 15:
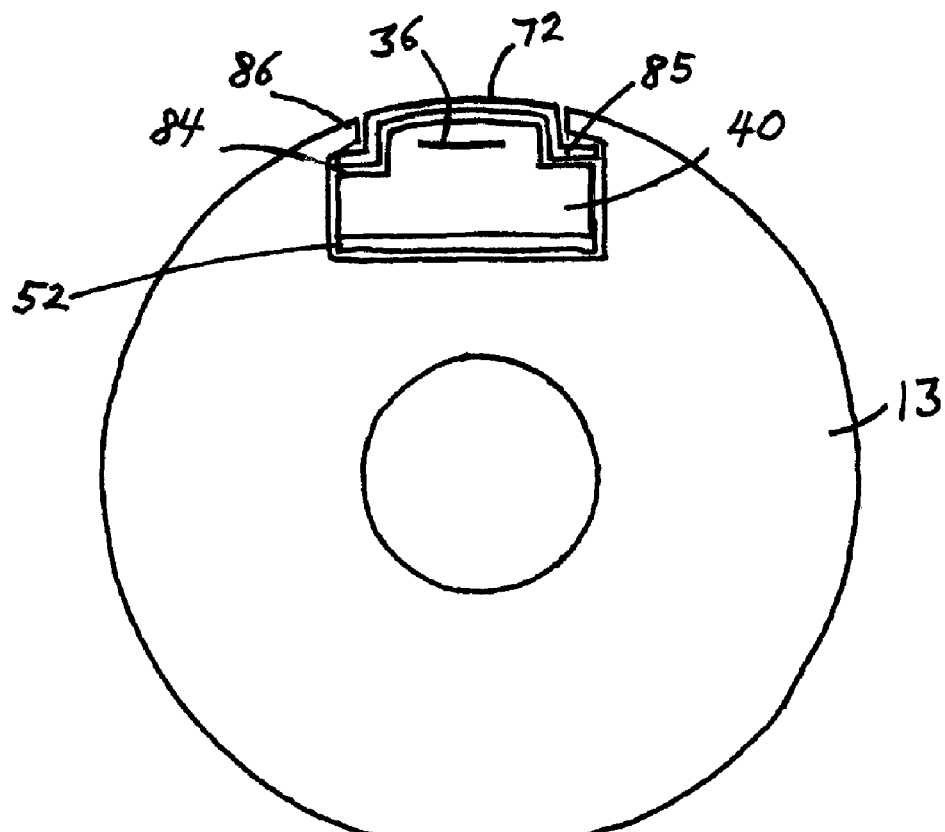
FIG. 15 is a cross-section of a transducer disposed in a tubular in accord with the invention.

FIG. 15 shows a cross-section of a transducer embodiment of the invention disposed within a tubular 13. In this embodiment, the acoustic transducer element 36 is encased or overmolded within a rubber compound 40 (See FIG. 3) formed rectangular in shape. The compound 40 is formed with a stepped or raised center portion such that shoulders 84 are formed. A rectangular-shaped shield 72 covers the transducer. The shield 72 matches with the transducer compound 40 with overhangs 85 that fit atop the shoulders 84, forming a flush surface with the exterior of the tubular 13. The recess 70 within the tubular 13 accepts the transducer/shield structure and is formed with extensions or lips 86 that retain the shield 72 therein. A support 52 can be added to the compound 40 if desired (See FIG. 7). Although one transducer element 36 is shown in FIG. 15, the transducer can be implemented with a multi-element or segmented transducer (See FIG. 6) array. Returning to FIG. 14, it is envisioned how the transducer compound 40 structure and shield(s) 72 of FIG. 15 are slid down the ramp 76 into the recess 70 under the lips 86. Once placed in the recess 70, the shield(s) 72 may be fastened to the tubular 13 using fasteners (e.g., screws) or any suitable means known in the art.

Figure 16:
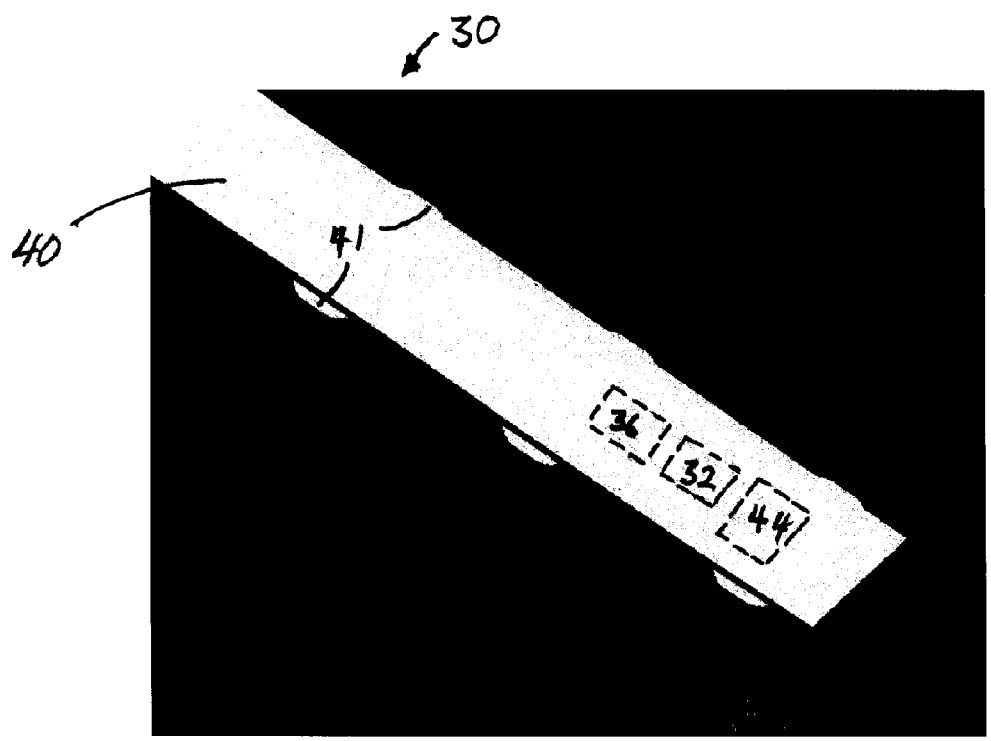
FIG. 16 shows a perspective view of an encased transducer in accord with the invention.

FIG. 16 shows another transducer 30 embodiment of the invention. A frame 38 equipped with one or more transducer elements 36, electronics modules 32, and an optional multiplexer 44, as described herein, is encased and sealed within a rubber compound 40 to form an elongated substantially rectangular transducer assembly (similar to FIG. 3). The over-mold compound 40 is configured with multiple extending tabs 41 on opposing edges of the rectangular assembly. The transducer 30 can be implemented with a support (See item 52 in FIG. 7) on either surface as desired (not shown). The signal/power leads are not shown for clarity of illustration.

Figure 18:
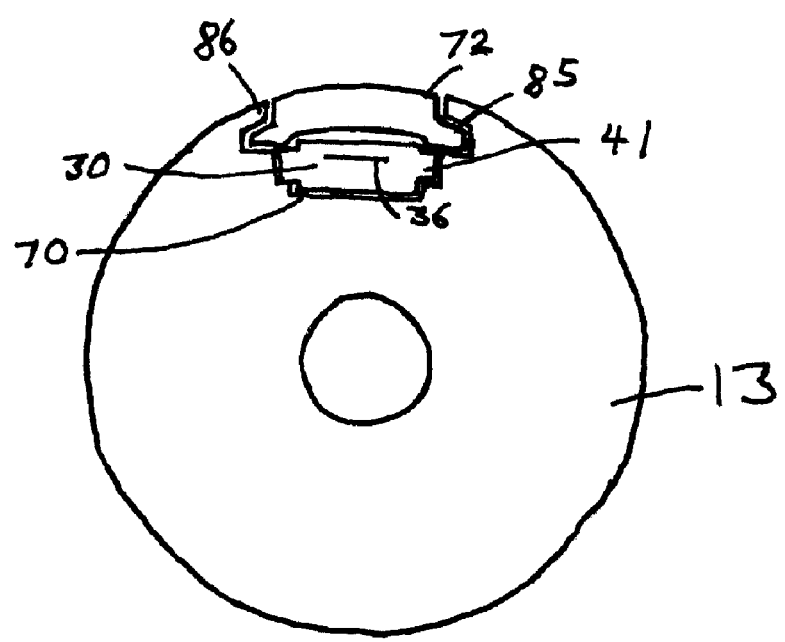
FIG. 18 is a cross-section of the transducer of FIG. 16 disposed in the tubular of FIG. 17.
Figure 17:
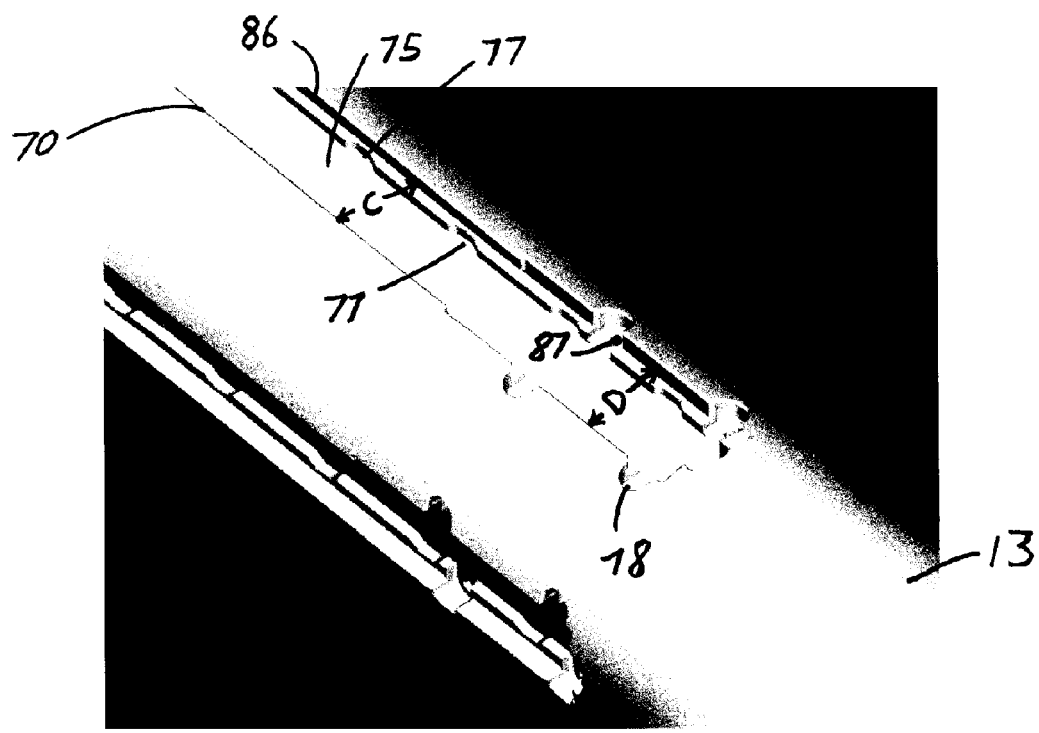
FIG. 17 shows a perspective view of a tubular configured to accept the transducer of FIG. 16.

FIG. 17 shows a downhole tubular 13 configured with a recess 70 to receive the transducer 30 shown in FIG. 16. The recess 70 is formed in a stepped fashion with a lower groove 75 to cradle the transducer 30 assembly. A series of indentations 77 are formed on the sides of the lower groove 75 to match with the tabs 41 extending from the sides of the transducer 30. When placed in the lower groove 75, the tabs 41 hold the transducer assembly preventing radial and axial movement. The recess 70 is also configured with extensions or lips 86 running along on opposite sides of the channel. FIG. 18 shows a cross section of the tubular shown in FIG. 17 with the transducer embodiment shown in FIG. 16.

Figure 19A:
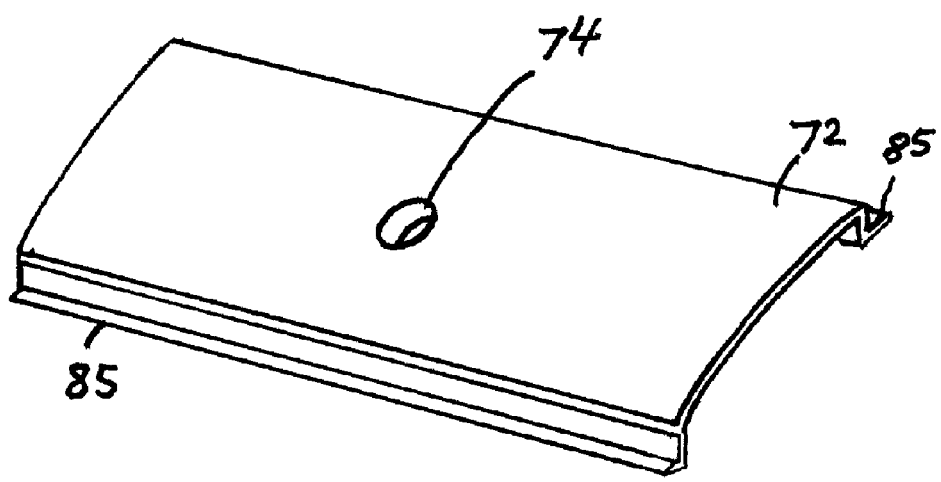
FIG. 19A shows a perspective view of a transducer shield in accord with the invention.
Figure 19B:
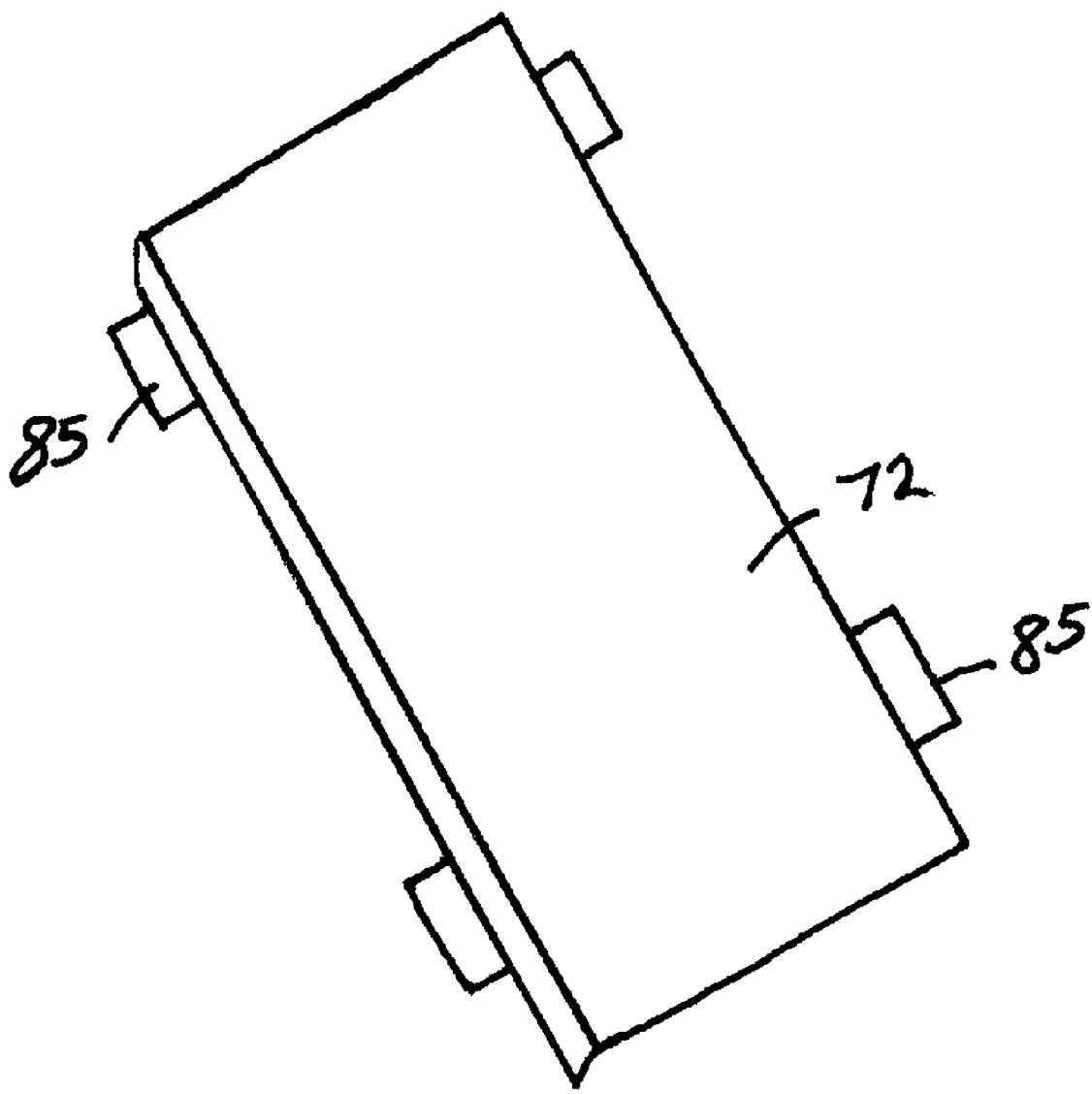
FIG. 19B shows a perspective view of another transducer shield in accord with the invention.

As shown in FIG. 18, a shield 72 is positioned atop the transducer 30 within the recess 70. The shield 72 is configured with overhangs 85 and forms a flush surface with the exterior of the tubular 13 as described above. The overhangs 85 on the shield 72 compress the rubber tabs 41 on the transducer 30, securing the transducer in the recess 70. The compression on the tabs 41 also provides a reaction force and presses the shield 72 against the lips 86 to prevent it from rattling. FIG. 19(A) shows a shield embodiment of the invention. FIG. 19(B) shows another shield 72 embodiment of the invention with smaller overhangs 85. These shields 72 may be configured with one or more apertures 74 as described above.

Returning to FIG. 17, one segment of the recess 70 is shown formed with a narrow channel C compared to another segment with channel width D. The wider recess 70 segment is configured with enlarged indentations 78 formed on opposite sides of the channel. With this embodiment, the transducer 30 assembly of FIG. 16 is simply dropped into the recess 70, facilitating repair and replacement. Once the transducer 30 is placed in the recess 70 and the appropriate signal/power connections are made as known in the art, a shield 72 is simply dropped into the wider recess 70 segment and slid under the lips 86 into position over the transducer 30. Depending on the length of the transducer 30, one or more shields 72 can be used to cover the entire length of the transducer.

Figure 20:
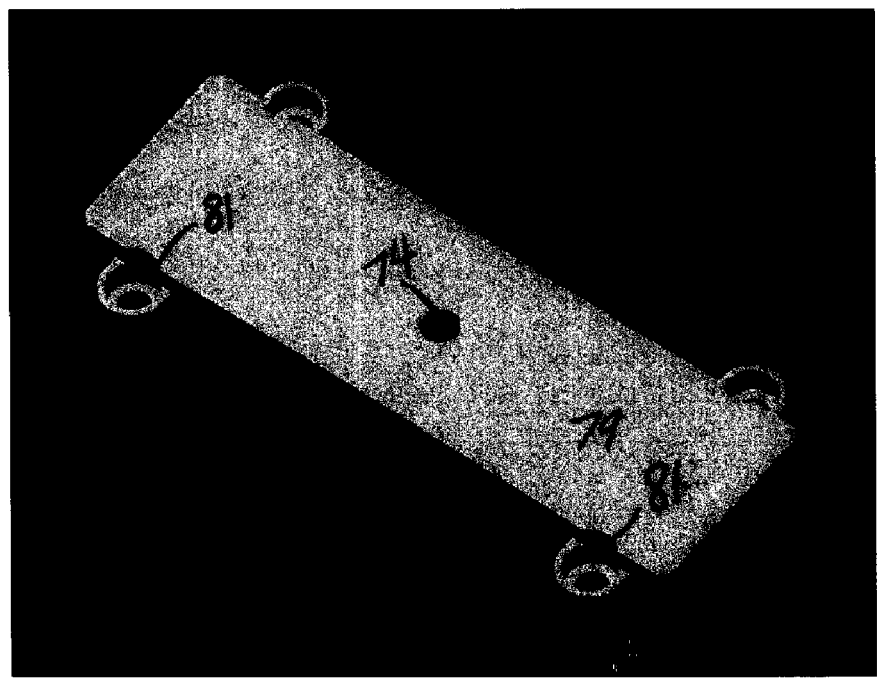
FIG. 20 shows a perspective view of another transducer shield in accord with the invention.

FIG. 20 shows another shield 79 embodiment of the invention. This shield 79 is similar to the shields shown in FIG. 19(A) and FIG. 19(B) except that it is formed without flanged overhangs (item 85 in FIGS. 19(A), 19(B)) and includes receptacles 81 extending from its sides. The shield 79 is configured with the appropriate width to fit snuggly within the wider channel segment D and may also be configured with one or more apertures 74 as described herein. The shield 79 may be formed of any suitable material. The shields 72, 79 of the invention can be constructed with smooth (i.e., flat) or rounded surfaces as desired and they can be formed from suitable materials as known in the art (e.g., metals, plastics, synthetic compounds, composites).

Figure 21:
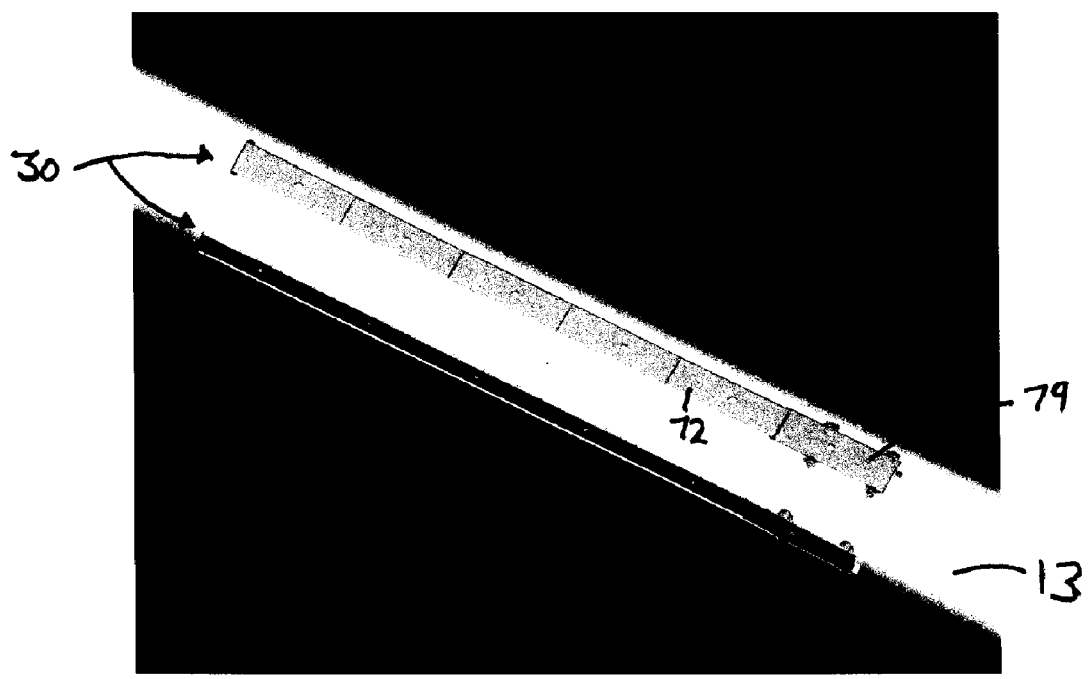
FIG. 21 shows a perspective view of a tubular configured with transducers and shields in accord with the invention.

FIG. 21 shows a tubular 13 equipped with a pair of axial transducer 30 embodiments (See FIG. 11(B)) of the invention. This embodiment is implemented with transducers 30, a recesses 70, and shields 72, 79 as described in FIGS. 16-20. A plurality of individual shields 72 was slid into the recess 70 to cover the transducer(s) 30 as described above. Each set of shields 72 is retained from sliding out of the recess 70 by a shield 79 as shown in FIG. 20. The shields 79 are secured onto the tubular 13 with fastener means (e.g., a screw, rivet) inserted through the receptacles 81 and into appropriate orifices (See item 87 in FIG. 17) formed in the tubular.

Unlike conventional acoustic transducers (e.g., oil compensated transducers), the compact and integrated configurations of the disclosed transducers 30 allow them to be mounted and retained within a tubular using various means known in the art. For example, when implemented in wireline instruments or other applications where abrasion is not a critical factor, the transducers 30 may be simply potted with a suitable compound into a cavity in the instrument (not shown).

A process for assembling acoustic transducer embodiments of the invention entails disposing an acoustic transducer element on frame means as described herein. An electronics module adapted to digitize a signal associated with the transducer element is then disposed on the frame means and linked to the acoustic transducer element. The transducer element and electronics module are then covered with a sealing material to implement a liquid-free assembly.

Figure 22:
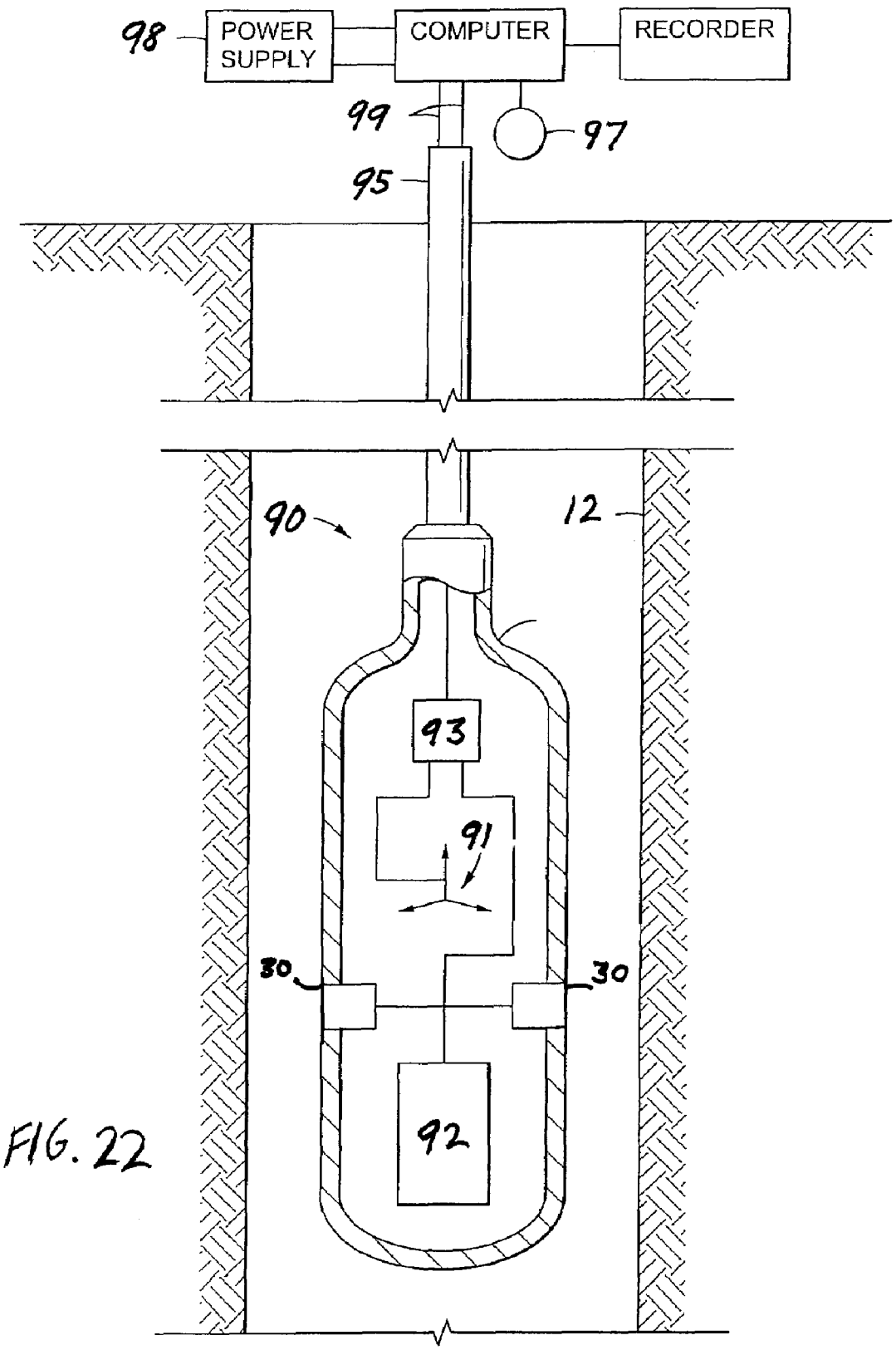
FIG. 22 is a schematic of a downhole tool incorporating transducer embodiments in accord with the invention.

FIG. 22 shows another embodiment of the invention. This embodiment includes the cup transducers 30 shown in FIG. 10. The transducers 30 are mounted in a downhole tool 90 disposed in a borehole 12 that penetrates an earth formation. The transducers 30 are located such that the transducer elements 36 are exposed to the borehole. The tool 90 also includes a multi-axial electromagnetic antenna 91 for subsurface measurements and electronics 92, 93 with appropriate circuitry. The tool 90 is shown supported in the borehole 30 by a logging cable 95 in the case of a wireline system or a drill string 95 in the case of a while-drilling system. With a wireline application, the tool 90 is raised and lowered in the borehole 30 by a winch 97, which is controlled by surface equipment 98. Logging cable or drill string 95 includes conductors 99 that connect the downhole electronics 92, 93 with the surface equipment 98 for signal and control communication. Alternatively, these signals may be processed or recorded in the tool 90 and the processed data transmitted to the surface equipment 98 as known in the art. The transducers of the invention may be mounted in conventional downhole tools using various well-known techniques. The electrical leads from the transducers of the invention can be routed as desired since the electronics modules/multiplexers can drive long cables. Conventional electronics, linking components (e.g., fiber optics), and connectors may be used to implement the disclosed transducer embodiments within measurement and communication apparatus as known in the art.

It will be appreciated by those of ordinary skill in the art that the present invention is applicable to, and can be implemented in, any field where acoustic transducers are used; it is not limited to subsurface applications. It will also be appreciated that the disclosed transducers are not limited to operation within any specific frequency or frequency range.

What is claimed is:

1. An acoustic transducer assembly for subsurface use, comprising:
    a frame;
    an acoustic transducer element disposed on the frame; and
    an electronics module disposed on the frame and linked to the acoustic transducer element;
    wherein the electronics module is adapted to process a signal associated with the transducer element, and the acoustic transducer assembly is configured for placement around the exterior surface of a tubular,
    wherein the transducer element and the electronics module are sealed to protect against external fluids.

2. The transducer assembly of claim 1, wherein the electronics module is adapted to digitize a signal associated with said transducer element.

3. The transducer assembly of claim 1, wherein the electronics module is adapted to process an analog signal.

4. The transducer assembly of claim 1, wherein the transducer element is adapted to emit acoustic energy.

5. The transducer assembly of claim 1, wherein the transducer element is adapted to receive acoustic energy.

6. The transducer assembly of claim 1, further comprising a multiplexer module linked to the electronics module.

7. The transducer assembly of claim 1, further comprising an acoustic damping material disposed near a surface of the transducer element.

8. The transducer assembly of claim 1, wherein the acoustic transducer element is selected from a group consisting of piezoelectric devices, lead titanate devices, lead zirconate-titanate devices, and 1-3 piezocomposite type devices.

9. The transducer assembly of claim 1, wherein the transducer element, the electronics module, and the frame are covered with a sealing material to protect against external fluids.

10. The transducer assembly of claim 9, wherein the covered assembly does not contain liquids.

11. The transducer assembly of claim 1, wherein the frame is formed with substantially flat surfaces with the acoustic transducer element and the electronics module disposed on a surface thereof.

12. The transducer assembly of claim 11, further comprising a rigid support affixed to a surface of the frame.

13. The transducer assembly of claim 1, wherein the frame is formed of a flexible material.

14. The transducer assembly of claim 1, wherein the frame is formed as a circuit board.

15. The transducer assembly of claim 14, wherein the transducer element is disposed in an opening in said circuit board.

16. The transducer assembly of claim 1, wherein the frame comprises circuitry disposed thereon.

17. The transducer assembly of claim 1, wherein the acoustic transducer element and the electronics module are juxtaposed on said frame.

18. The transducer assembly of claim 1, comprising a plurality of acoustic transducer elements disposed on the frame.

19. The transducer assembly of claim 18, wherein said transducer elements are spaced within 5 to 16 centimeters apart on said frame.

20. The transducer assembly of claim 18, wherein the transducer is adapted to process multiple signals associated with said acoustic transducer elements.

21. The transducer assembly of claim 18, comprising a plurality of electronics modules disposed on the frame and linked to said transducer elements.

22. The transducer assembly of claim 21, further comprising a multiplexer module linked to at least one of said electronics modules.

23. The transducer assembly of claim 1, comprising a plurality of individual flames linked to one another, said flames having electronics modules and acoustic transducer elements disposed thereon.

24. The transducer assembly of claim 23, further comprising a multiplexer module linked to at least one of said electronics modules.

25. The transducer assembly of claim 1, further comprising a switch linking the electronics module and transducer element such that said transducer element can be selectively activated to receive or emit acoustic energy.

26. An acoustic transducer assembly for subsurface use, comprising:
    a frame;
    an acoustic transducer element disposed on the frame;
    an electronics module disposed on the frame and linked to the acoustic transducer element; and
    the electronics module adapted to digitize a signal associated with the transducer element;
    wherein said transducer element and said electronics module are covered with a sealing material to protect against external fluids, and the acoustic transducer assembly is configured for placement around the exterior surface of a tubular.

27. The transducer assembly of claim 26, wherein the transducer element is adapted to emit acoustic energy.

28. The transducer assembly of claim 26, wherein the transducer element is adapted to receive acoustic energy.

29. The transducer assembly of claim 26, wherein the electronics module is adapted to process an analog signal associated with the transducer element.

30. The transducer assembly of claim 26, wherein the frame is formed as a circuit board.

31. The transducer assembly of claim 30, wherein the transducer element is disposed in an opening in said circuit board.

32. The transducer assembly of claim 26, wherein the frame is formed of a flexible material.

33. The transducer assembly of claim 26, comprising a plurality of electronics modules and acoustic transducer elements disposed thereon and linked to one another.

34. The transducer assembly of claim 33, wherein said transducer elements are spaced within 5 to 16 centimeters apart on said frame.

35. The transducer assembly of claim 33, wherein the frame is formed as a circuit board.

36. The transducer assembly of claim 33, further comprising a multiplexer module linked to at least one of said electronics modules.

37. The transducer assembly of claim 26, wherein the covered assembly does not contain liquids.

38. The transducer assembly of claim 26, further comprising a switch linking the electronics module and transducer element such that said transducer element can be selectively activated to receive or emit acoustic energy.

39. An acoustic transducer assembly for subsurface use, comprising:
    a disc-shaped acoustic transducer element having a first surface opposite a second surface;

an electronics module coupled to and adjacent to the second surface of the transducer element and adapted to process a signal associated with said acoustic transducer element;

said electronics module having at least one signal lead coupled thereto;

acoustic damping material disposed round the electronics module and the acoustic transducer element;

wherein the acoustic transducer element, the electronics module, and the damping material are enclosed within a sealing material leaving the at least one lead exposed.

40. The transducer assembly of claim 39, wherein the acoustic transducer element is selected from a group consisting of piezoelectric devices, lead titanate devices, lead zirconate-titanate devices, and 1-3 piezocomposite type devices.

41. The transducer assembly of claim 39, wherein the electronics module is adapted to amplify a signal associated with acoustic energy received at the first surface of said acoustic transducer element.

42. The transducer assembly of claim 39, wherein the electronics module comprises a circuit board.

43. The transducer assembly of claim 42, wherein the electronics module is adapted to process an analog signal associated with the transducer element.

44. The transducer assembly of claim 42, wherein the electronics module is adapted to digitize a signal associated with the transducer element.

45. The transducer assembly of claim 42, wherein the sealed assembly does not contain liquids.

46. The transducer assembly of claim 39, further comprising a switch linking the electronics module and transducer element such that said transducer element can be selectively activated to receive or emit acoustic energy via said first surface.

47. An acoustic transducer assembly for subsurface use, comprising:

an elongated planar frame;

an acoustic transducer element disposed on the frame; and an electronics module disposed on the frame and linked to the acoustic transducer element;

wherein the electronics module is adapted to digitize a signal associated with the transducer element, and the acoustic transducer assembly is configured for placement around the exterior surface of a tubular, wherein the transducer element and the electronics module are sealed to protect against external fluids.

48. The transducer assembly of claim 47, wherein the transducer element is adapted to receive acoustic energy.

49. The transducer assembly of claim 47, wherein the transducer element is adapted to emit acoustic energy.

50. The transducer assembly of claim 47, further comprising a multiplexer module linked to the electronics module.

51. The transducer assembly of claim 47, wherein the acoustic transducer element is selected from a group consisting of piezoelectric devices, lead titanate devices, lead zirconate-titanate devices, and 1-3 piezocomposite type devices.

52. The transducer assembly of claim 47, wherein the transducer element, the electronics module, and the frame are covered with a sealing material to protect against external fluids.

53. The transducer assembly of claim 52, wherein the covered assembly does not contain liquids.

54. The transducer assembly of claim 47, wherein the frame is formed of a flexible material.

55. The transducer assembly of claim 47, wherein the frame is formed as a circuit board.

56. The transducer assembly of claim 55, wherein the transducer element is disposed in an opening in said circuit board.

57. The transducer assembly of claim 47, wherein the frame comprises circuitry disposed thereon.

58. The transducer assembly of claim 47, wherein the acoustic transducer element and the electronics module are juxtaposed on said frame.

59. The transducer assembly of claim 47, comprising a plurality of acoustic transducer elements disposed on the frame.

60. The transducer assembly of claim 59, wherein said transducer elements are spaced within 5 to 16 centimeters apart on said frame.

61. The transducer assembly of claim 59, wherein the assembly is adapted to process multiple signals associated with said acoustic transducer elements.

62. The transducer assembly of claim 47, further comprising a switch linking the electronics module and transducer element such that said transducer element can be selectively activated to receive or emit acoustic energy.

63. A method for assembling an acoustic transducer, comprising:

disposing an acoustic transducer element on frame means;

disposing an electronics module on said frame means;

linking the acoustic transducer element to the electronics module, said electronics module adapted to digitize a signal associated with said transducer element; and covering said transducer element and said electronics module with a sealing material not including liquids; and configuring the acoustic transducer assembly for placement around the exterior surface of a tubular.

* * * * *